W. P. DUNLAP.
LOG WAGON.
APPLICATION FILED NOV. 8, 1910.
990,241.
Patented Apr. 25, 1911.
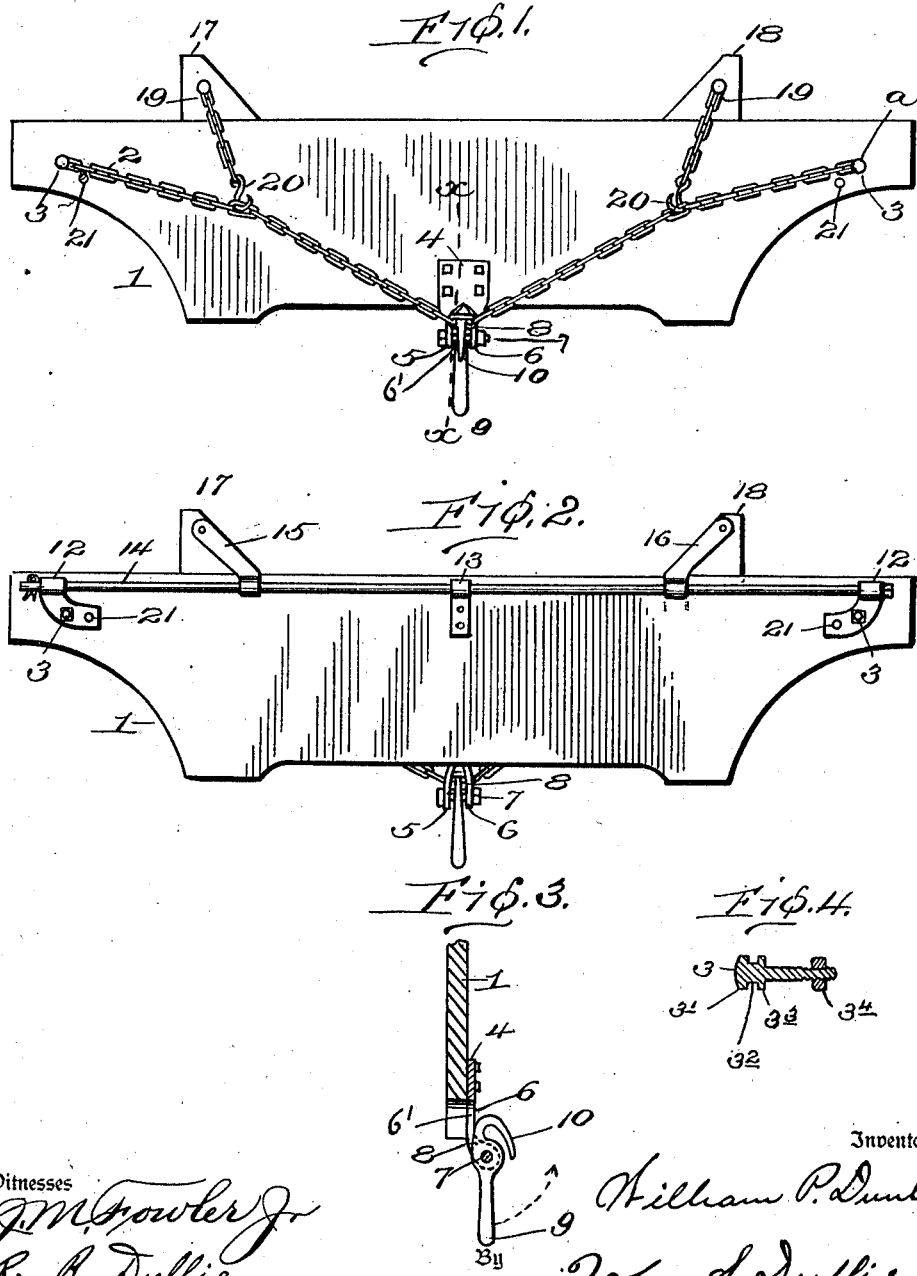
Witnesses
J. M. Fowler Jr
R. R. Duffie
Inventors
William P. Dunlap
By John S. Duffie
Attorneys

UNITED STATES PATENT OFFICE.

WILLIAM PEN DUNLAP, OF FRANKLINTON, LOUISIANA.

LOG-WAGON.

990,241.  Specification of Letters Patent.  Patented Apr. 25, 1911.

Application filed November 8, 1910. Serial No. 591,228.

*To all whom it may concern:*

Be it known that I, WILLIAM P. DUNLAP, a citizen of the United States, residing at Franklinton, in the parish of Washington and State of Louisiana, have invented certain new and useful Improvements in Log-Wagons, of which the following is a specification.

My invention refers to log wagons and consists in a device whereby the logs or lumber of any kind may be piled on the wagon and secured and released by the device shown in the accompanying drawings.

This device is so constructed that the main chain which holds the standard in place is secured by a reversible hook, the hook may be reversed and the chain thereby released and then the standards thrown out of the way. The hook may be reversed with one movement by one hand.

Reference being had to the drawings, Figure 1, is a rear view of the device. Fig. 2, is a front view. Fig. 3, is a vertical sectional view of the device cut on the line $x\,x$ of Fig. 1. Fig. 4, is a sectional view of one of the end bolts and nuts by which the main chain is attached.

With the foregoing and other objects in view my invention consists in the novel construction, combination and arrangement of the parts as are described in this specification, illustrated in the accompanying drawings forming a part thereof and particularly pointed out in the appending claims.

My invention is described as follows: The numeral 1, represents the rear bolster of a wagon in which Fig. 1, represents the rear side of the bolster, and to this rear side is secured a heavy strong chain 2, by means of bolts and nuts 3. Secured to the rear face of said bolster and depending a little below the lower edge thereof is a plate 4. The lower part of this plate 4, is divided into two arms 5, and 6, respectively, see Fig. 2. Pivoted in the lower end of said arms by bolt and nut 7, is a reversible hook 8, this hook is provided with a dependent handle 9. The bill part 10, extends up some distance above the pivoted bolt 7, and then turns outwardly and downwardly, this hook is so constructed, as will be seen by reference to Fig. 3, that the harder the chain 2, is pulled on the more securely it is held in place. When I desire to release the said chain the handle 9, may be turned up, and this turns the bill 10, back into the slot 6', in the plate 4, by which action the chain is immediately released.

To the front face of the bolster is secured two rod holders 12, one at each end of the bolster and one rod holder 13, in the middle of the bolster. Secured in these rod holders is a rod 14. Working on this rod, one near the right and the other near the left hand end thereof, are two sliding standard holders 15, and 16, respectively. These sliding holders are secured at their upper ends by bolts or other securely fastening devices to sliding standards 17, and 18, respectively. Secured to the rear faces of said sliding standards, one to each by bolts, is one end of a chain 19. The free end of each of these chains is provided with a hook 20. The ends of the main chain 2, are secured in place by the bolts and nuts as shown in Fig. 1; and one bolt of the rod holders 12, is the same as the bolt by which the main chain is secured. This bolt 3, is provided with a head $3'$, neck $3^2$, shoulder $3^3$, and nut $3^4$, the other fastenings 21, of these rod holders 12, may be ordinary bolts, screws, or the like.

When I desire to load the wagon I turn the two standard holders 17, and 18, forward when they drop down against the forward face of the bolster, and then I put the load on from one or both sides of the wagon as I see fit, then I turn the standards back on top of the bolster, then I slip them up snugly against the load, I turn the handle up of the reversible hook up and let the 9, of the reversible hook up and let the chain 2, rest just below the up turned part of the hook, then I take the two hooks 20, and hook them as tightly as I can into the said chain, being careful not to withdraw it from the hook 10, and when the hooks 20, are properly in place I turn the hook 10, down, thus it will be seen that the standards are, by the device described, firmly held in place and the harder the chain is pulled on the more securely it is held in said hook. I may secure a like device to the front swinging bolster of the wagon but I don't deem it necessary to describe it as it would be the same as the one above described.

Having described my invention what I claim as new, is,

1. The combination of a wagon bolster 1, rod holders 12, one secured at each end of said bolster and on the front face thereof, a rod 14, secured in said rod holders, standard holders 15, and 16, slidably pivoted on said rod, standards 17 and 18, adapted to slide on the upper edge of said bolster and secured to said standard holders, a rod holder 13, secured to the front face and midway between each end of said bolster, said standard holders and standards adapted to be turned forward and dropped against the front face of said bolster, a chain 2, having its ends secured to the rear face and near the ends of said bolster by means of a shouldered nut and bolt 3, chains 19, having their ends, each, secured to the rear face of said standards, hooks 20, secured to the free ends of said chain and adapted to be hooked in the links of said chain 2, a plate 4, secured to the middle, rear face, and near the lower edge of said bolster, said plate provided with depending arms 5 and 6, a reversible hook 8, pivotedly secured in the lower ends of said arms, said hook provided with a handle 9, and a bill 10, the bill part of said hook extends upwardly some distance above its pivot and its handle 9 downwardly some distance below its pivot, substantially as described.

2. In a device of the nature described in combination with a wagon bolster, two standards pivotally and adjustably hinged to a horizontal bar running on the front side and near the upper edge of said bolster, a chain running horizontally on the rear face of said bolster having each end securely bolted near each end of said bolster, chains having one end of each secured to said standards, hooks secured to the free ends of said chains adapted to hook in said chain horizontally secured to said bolster, a reversible hook secured to the rear face and immediately below the lower edge of said bolster, adapted to hold said last-mentioned chain when said hook is reversed, substantially as shown.

3. In a device of the nature described provided with a chain 2, horizontally secured to said bolster, sliding standards 17 and 18, pivotally and slidably mounted on said bolster, chains 19, secured to said standards and hooks 20, adapted to hook in said horizontal chain: a plate 4, secured on the rear face, midway said bolster and at the lower edge thereof, said plate having downwardly extending arms 5 and 6, a reversible hook 8, having a handle 9, its bill part extending upwardly above its pivot its point turning outwardly and then downwardly, its handle 9 extending downwardly below the pivot of said hook.

In testimony whereof I affix my signature in presence of two witnesses.

WILLIAM PEN DUNLAP.

Witnesses:
J. R. SCHILLING,
T. A. MAGILL.

---

Copies of this patent may be obtained for five cents each, by addressing the "Commissioner of Patents, Washington, D. C."